(12) United States Patent
Jung

(10) Patent No.: US 11,821,144 B2
(45) Date of Patent: Nov. 21, 2023

(54) METHOD OF MANUFACTURING SANITARY PAPER FOR DOG FECES AND SANITARY PAPER MANUFACTURED THEREBY

(71) Applicant: MORRIS&CO CO., LTD., Chungcheongbuk-do (KR)

(72) Inventor: Tae Bong Jung, Seoul (KR)

(73) Assignee: MORRIS & COCO., LTD., Chungcheongbuk-do (KR)

( * ) Notice: Subject to any disclaimer, the term of this patent is extended or adjusted under 35 U.S.C. 154(b) by 157 days.

(21) Appl. No.: 17/494,447

(22) Filed: Oct. 5, 2021

(65) Prior Publication Data

US 2022/0243403 A1    Aug. 4, 2022

(30) Foreign Application Priority Data

Feb. 4, 2021   (KR) .................. 10-2021-0015989

(51) Int. Cl.
*D21H 27/00*    (2006.01)
*D21H 11/14*    (2006.01)
(Continued)

(52) U.S. Cl.
CPC ........... *D21H 27/002* (2013.01); *D21H 11/14* (2013.01); *D21H 17/17* (2013.01); *D21H 17/55* (2013.01);
(Continued)

(58) Field of Classification Search
CPC ...... D21H 27/002; D21H 11/14; D21H 17/17; D21H 17/55; D21H 17/72; D21H 21/16; D21H 21/20; D21H 27/02; D21H 25/04; D21H 27/007; D21H 13/08; D21H 17/05; D21H 17/54; D21H 19/74; D21H 19/76; A01K 1/0125; E01H 1/1206; A47K 10/16
See application file for complete search history.

(56) References Cited

U.S. PATENT DOCUMENTS 7,718,035 B2 * 5/2010 Boettcher ............ D21H 21/146
                                                         162/111
2010/0184902 A1 * 7/2010 Boettcher ............ D21H 21/146
                                                         524/417

(Continued)

FOREIGN PATENT DOCUMENTS

CN    115157777 A   * 10/2022
EP    4039881 A1   *  8/2022  ............. A47K 10/16
(Continued)

OTHER PUBLICATIONS

Machine Translation of JP-2020038062 A. (Year: 2020).*
Machine Translation of JP-2004124331 A. (Year: 2004).*

*Primary Examiner* — Jose A Fortuna
(74) *Attorney, Agent, or Firm* — LRK PATENT LAW FIRM

(57) ABSTRACT

A method of manufacturing sanitary paper for handling dog feces is disclosed. The sanitary paper has good water resistance, wet strength, elasticity, and water dispersibility. As a result, the sanitary paper can be used to collect and carry feces and can be disposed of in a toilet. Since the sanitary paper manufactured has water resistance, appropriate wet strength, flexibility, and water dispersibility, the sanitary paper can easily be used to wrap and sanitarily carry dog feces and will not clog of a toilet when the sanitary paper is flushed down a toilet.

15 Claims, 1 Drawing Sheet

(51) Int. Cl.
*D21H 17/17* (2006.01)
*D21H 17/15* (2006.01)
*D21H 17/00* (2006.01)
*D21H 21/16* (2006.01)
*D21H 21/20* (2006.01)
*D21H 27/02* (2006.01)
*D21H 17/55* (2006.01)

(52) U.S. Cl.
CPC ............. *D21H 17/72* (2013.01); *D21H 21/16* (2013.01); *D21H 21/20* (2013.01); *D21H 27/02* (2013.01)

(56) References Cited

U.S. PATENT DOCUMENTS

| | | | |
|---|---|---|---|
| 2022/0243403 A1* | 8/2022 | Jung | .................... A01K 1/0125 |
| 2023/0064101 A1* | 3/2023 | Jung | ....................... B65F 1/002 |

FOREIGN PATENT DOCUMENTS

| | | | | | |
|---|---|---|---|---|---|
| JP | 2004124331 | A | * | 4/2004 | |
| JP | 2007131965 | A | * | 5/2007 | |
| JP | 2007-154389 | A | | 6/2007 | |
| JP | 2008-088587 | A | | 4/2008 | |
| JP | 2008266862 | A | * | 11/2008 | |
| JP | 2009-161900 | A | | 7/2009 | |
| JP | 4876320 | B2 | | 2/2012 | |
| JP | 4916832 | B2 | | 4/2012 | |
| JP | 4969592 | B2 | | 7/2012 | |
| JP | 2020038062 | A | * | 3/2020 | ......... A61B 10/0038 |
| KR | 20-2016-0002286 | U | | 7/2016 | |

* cited by examiner

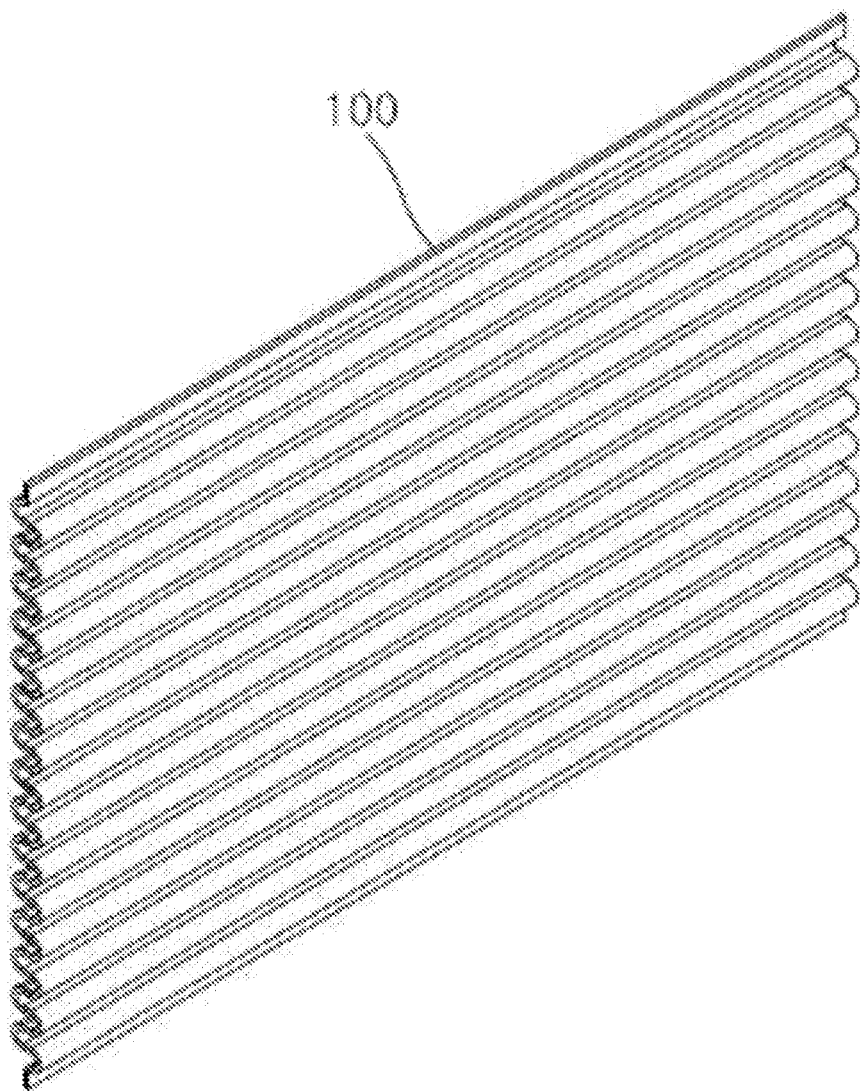

METHOD OF MANUFACTURING SANITARY PAPER FOR DOG FECES AND SANITARY PAPER MANUFACTURED THEREBY

CROSS REFERENCE TO RELATED APPLICATION

The present application claims priority to Korean Patent Application No. 10-2021-0015989, filed Feb. 4, 2021, the entire content of which is incorporated herein for all purposes by this reference.

BACKGROUND OF THE INVENTION

1. Field of the Invention

The present disclosure relates to a method for manufacturing a sanitary paper for handling dog feces, and a sanitary paper manufactured thereby. More particularly, the present disclosure relates to a method of manufacturing a sanitary paper for handling dog feces before throwing the dog feces in a toilet, the sanitary paper having water resistance, wet strength, elasticity, and water dispersibility so as to endure until the disposal of the dog feces, and also relates to a sanitary paper manufactured by the method.

2. Description of Related Art

In general, a companion animal is an animal that lives with people. Such an animal provides various benefits to humans, and pet owners see such companion animals living beings rather than just toys. In particular, among companion animals, a dog can be said to be an animal that gives much of emotional satisfaction to humans.

There are about 5.98 million companion dogs in Korea (2019, Ministry of Agriculture, Food and Rural Affairs statistics), and the number of companion dogs to appease human loneliness is expected to increase by at least 5% every year in the future due to the increase in single-person households and the elderly population. In addition, a similar trend is also observed in neighboring China. According to the Shenyang Trade Bureau of China, the number of companion dogs in China is estimated to be about 55.03 million as of 2019, and the number of dogs in China is expected to increase by at least 2% every year in the future.

Companion dogs also defecate like humans. Dogs typically defecate once a day on average, and depending on how often dog owners walk their dogs, dogs sometimes have two or three bowel movements a day, but this is an exceptional case and once a day is average.

According to Paragraph 12 of Article 3 (Types of Misdemeanors) of the Misdemeanor Punishment Act, a law related to the disposal of dog feces, "Spitting, urinating, or having to urinate in a street, park, or other places where many people gather or pass through" is prohibited. The duty to dispose of pet feces is stipulated to punish those who bring animals such as dogs or other animals and fail to remove feces when the animals defecate. In addition, Paragraph 2 of Article 13 of the Animal Protection Act stipulates that the handling of feces of companion animals is as follows: when going out with the registered animal, the owner, etc. of a companion animal has to put a safety gear, such as a leash, and has to immediately collect excrement (in the case of urine, urination is prohibited in public spaces inside buildings, such as elevators and stairs of an apartment house, and on equipment that can be laid on or seated on by people, such as wooden benches or chairs), as prescribed by the Ministry of Agriculture, Food and Rural Affairs.

When walking a dog, the dog owner must tie a leash around the dog's neck, connect a lead to the leash to control the dog, and muzzle the dog.

When walking a dog, a dog may defecate, and the owner must manage the feces. As a general method of disposing of dog feces, feces is put into plastic bags and discarded as general trash, but this method has a problem of causing environmental pollution when incinerated. A plastic bag that does not easily decompose and causes air pollution when incinerated, but most of the dog feces is placed in plastic bags for disposal.

The number of plastic bags used for handling dog feces is not small. Assuming that the current number of domestic dogs is 5.98 million, when a dog walks once a day and defecates during this time, 5.98 million plastic bags are used a day to dispose of the feces.

Recently, the average temperature of the earth's atmosphere is rising due to the greenhouse effect caused by global warming, and environmental problems such as abnormal climate are continuously becoming issues around the world. In Korea, environmental problems such as yellow dust, fine dust, and air pollution, which are directly related to the health of the nation, are emerging as big social problems to be solved. Continuous attention is focused on ways to reduce the use of plastics that are not easily decomposed and emit toxic substances such as dioxins during incineration.

As interest in environmental pollution grows, efforts toward environment-friendly society continue to be made. As part of the efforts, there is the trend of finding and developing alternatives to conventional resources that have been used in various industries. For the reason, biodegradable plastics have been in the spotlight. However, Professor Richard Thompson of the Department of Marine Biology at the University of Plymouth, UK, said, "As a result of observing an eco-friendly bag that is more than 10 years old, it has only been transformed into millions of microscopic pieces of plastic rather than decomposed." Moreover, when polylactic acid (PLA) plastic which is a biodegradable plastic, is used instead of the plastic bag, when it is not separately classified, it is eventually treated like general waste, so the same problem exists therefore.

Therefore, it is eco-friendly and hygienic when feces is collected using paper towels such as toilet paper or paper such as kitchen towels and hand towels and disposing of them in the toilet instead of using plastic to for disposal of dog feces.

However, existing toilet paper or paper towels have good absorbency but poor water resistance, so when collecting dog feces with paper, there is a problem that wet feces leaks from the paper. In addition, paper towels cause a problem of clogging a toilet due to poor water dispersibility caused by excessive wet strength.

DOCUMENTS OF RELATED ART

Korean Utility Model Publication No. 20-2016-0002286 (published on Jul. 1, 2016), titled "Portable Wet Tissue and Defecation Bag Packaging Case"

SUMMARY OF THE INVENTION

The present disclosure has been made in view of the problems occurring in the related arts, and an objective of the present disclosure is to provide a method of manufacturing a sanitary paper for collecting and carrying dog feces and a sanitary paper manufactured by the method. The sanitary paper is used to collect and carry dog feces before the dog feces is disposed in a toilet. The sanitary paper is imparted with water resistance, sufficient wet strength, elasticity, and water dispersibility to fulfill the purpose thereof.

Another objective of the present disclosure is to provide a method of manufacturing a sanitary paper that is properly creped during a drying process so that the sanitary paper is easy to wrap dog feces not to leak.

A further objective of the present disclosure is to provide a sanitary paper for dog feces, the sanitary paper having proper water resistance, wet strength, elasticity, and water dispersibility not to clog a toilet when disposed in a toilet along with the dog feces.

To accomplish the objectives, one aspect of the present disclosure provides a method for manufacturing a sanitary paper for dog feces, the method including: performing hydrophilization to impart a sanitary paper with water resistance by adding 1 to 1.5 wt % of an alkyl ketene dimer (AKD: Alkyl Ketene Dimer), which is a neutral sizing agent as an internal sizing, to a sanitary paper raw material; adding 1 to 1.5 wt % of polyamide polyamine-epichlorohydrin (PAE) serving as a wet strength enhancer to the sanitary paper raw material to impart the sanitary paper with wet strength and water dispersibility; creping a sanitary paper thus produced at a rate of 10 to 15 crepe/cm when drying the sanitary paper to impart the sanitary paper with elasticity and to prevent feces from leaking.

In the present disclosure, 1.3 wt % of an alkyl ketene dimer (AKD), which is a neutral sizing agent as an internal sizing, may be added so that the sanitary paper is imparted with water resistance.

In one embodiment of the present disclosure, 1.3 wt % of PAE, which is a wet strength enhancer, may be added so that the sanitary paper is imparted with wet strength and water dispersibility.

In one embodiment of the present disclosure, the sanitary paper may be creped at a rate of 13 crepe/cm during the drying process to impart the sanitary paper with elasticity and to prevent feces from leaking from the sanitary paper wrapping the feces.

In one embodiment of the present disclosure, the sanitary paper raw material may include biodegradable cellulose such as recycled pulp.

Another aspect of the present disclosure provides a sanitary paper manufactured by the method according to one embodiment of the present disclosure for handling dog feces, the sanitary paper having proper water resistance, wet strength, elasticity, and water dispersibility.

In one embodiment of the present disclosure, the sanitary paper may be made from a raw material containing biodegradable cellulose, such as recycled pulp, etc.

Since the sanitary paper has proper water resistance, wet strength, elasticity, and water dispersibility, when the sanitary paper with which dog feces is wrapped is disposed in a toilet, it is possible to prevent the toilet from clogging.

According to the present disclosure, it is possible to prevent a toilet from clogging when the dog feces wrapped with the sanitary paper is disposed in the toilet because the sanitary paper has proper water resistance, wet strength, elasticity, and water dispersibility. Therefore, with the use of the sanitary paper, it is possible to conveniently dispose of dog feces.

In addition, since the sanitary paper undergoes creping during the drying process to be corrugated, it is possible to easily wrap dog feces with the sanitary paper and to prevent the dog feces from leaking when disposing of the dog feces.

In addition, the sanitary paper of the present disclosure makes it possible to collect and carry dog feces without using plastic bags that are not biodegradable. Since the sanitary paper of the present disclosure is made from biodegradable substances, it does not cause environmental pollution unlike plastic bags that causes air pollution when incinerated for disposal and which takes a very long time to decompose when disposed in a landfill.

BRIEF DESCRIPTION OF THE DRAWINGS

The above and other objectives, features, and advantages of the present disclosure will be more clearly understood from the following detailed description taken in conjunction with the accompanying drawings, in which:

FIG. 1 is a perspective view illustrating a sanitary paper for dog feces, according to one embodiment of the present disclosure.

DETAILED DESCRIPTION OF THE PREFERRED EMBODIMENTS

Hereinafter, some embodiments of the present disclosure will be described in detail with reference to exemplary drawings. In adding reference numerals to the components of each drawing, the same components are given the same reference numerals as much as possible even though they are indicated on different drawings. In addition, in describing the embodiment of the present disclosure, when it is determined that a detailed description of a related known configuration or function interferes with the understanding of the embodiment of the present disclosure, the detailed description thereof will be omitted.

In addition, in describing the components of the embodiment of the present disclosure, terms such as first, second, A, B, (a), (b), etc. may be used. These terms are only for distinguishing the components from other components, and the essence, order, or order of the components are not limited by the terms. When it is described that a component is "connected", "coupled", or "connected" to another component, the component may be directly connected or connected to the other component, but another component is between each component may be "connected", "coupled", or "connected".

The present disclosure relates to a method for manufacturing a sanitary paper for handling dog feces so that dog feces can be collected and disposed in the toilet.

The present disclosure provides a method of manufacturing a sanitary paper for handling dog feces, the method including: a step of performing hydrophilization to impart a sanitary paper with water resistance by adding 1 to 1.5 wt % of an alkyl ketene dimer (AKD: Alkyl Ketene Dimer), which is a neutral sizing agent as an internal sizing, to a sanitary paper raw material. internal sizing; a step of adding 1 to 1.5 wt % of polyamide polyamine-epichlorohydrin (PAE) as a wet strength enhancer to the sanitary paper raw material so that the produced sanitary paper has wet strength and water dispersibility; and a step of performing creping processing at a rate of 10 to 15 crepe/cm when drying the produced sanitary paper to provide elasticity to the sanitary paper and to prevent feces from sticking to a user's hand.

The present disclosure imparts water resistance, appropriate wet strength, elasticity, and water dispersibility to the sanitary paper through the manufacturing method so that the sanitary paper can be conveniently used to handle dog feces. Therefore, even when the dog feces is collected with sanitary paper and then disposed the toilet, the feces can be sanitarily and conveniently disposed without causing the clogging of the toilet. In addition, since the sanitary paper is creped to have wrinkles during the drying process, it is easier to wrap the dog's feces with the sanitary paper according to the present disclosure. Therefore, the feces can be easily handled and managed without leaking from the paper.

Hereinafter, the configuration and operation of the present disclosure will be described.

Paper is obtained by dispersing cellulose derived from finely ground wood in water to prepare dispersion, putting a sieve with fine holes into the dispersion, taking the sieve, dehydrating a solid material remaining on the sieve, and drying the solid material to obtain paper. Making the paper resistant to water is called sizing processing.

This sizing processing is divided into internal sizing which is performed before drying paper in the paper making process and external addition sizing which is performed after drying paper. The present disclosure relates to the internal sizing process. The internal sizing refers to a process of putting a sizing agent into a paper raw material which is a mixture of pulp, water, filler, etc. before the paper drying process.

Conventionally, toilet paper or paper towels were used to wrap dog feces in place of plastic bags and dispose thereof in a toilet, but existing paper, which lacked water resistance, was difficult to use due to the problem of feces leaking out of the paper.

In the present disclosure, in terms of supplementing insufficient water resistance of the existing sanitary paper, an alkyl ketene dimer (AKD), a neutral sizing agent as an internal sizing, was added to the paper to hydrophobized the paper appropriately.

Hydrophobic property refers to the property of not being easily combined with water molecules. Generally, when a material is not polar, the material is hydrophobic. In addition, the hydrophobic (lipophilic) material does not mix with water, so round droplets of water are formed on the material due to the surface tension.

A representative of internal sizing agents is AKD (CAS registration number 144245-85-2), which is a neutral sizing agent. The AKD is a common sizing agent widely used domestically and abroad. It is available in the form of an emulsion so that the AKD can be mixed well with water. The emulsion contains particles each having a size of 0.1 to 5 µm, and a solid content of about 15% to 25%.

AKD emulsifies the wax with a substance such as cationic starch to make the wax more water-miscible when the paper is in a stock state before the paper forms a paper web. The emulsified wax is put into the paper stock, and the outer film of emulsified wax is broken in the process of forming and drying the paper, leaving the wax inside the paper, giving the paper hydrophobicity to water.

In the present disclosure, 1 to 1.5 wt % of an AKD, which is a neutral sizing agent for internal sizing, is added to the raw material of the sanitary paper to make the produced sanitary paper hydrophobic in order to provide water resistance to the sanitary paper for handling dog feces. Here, when the AKD is added less than 1 wt %, the amount of water absorbed in the sanitary paper will increase excessively and the dog feces will leak out when wrapped with sanitary paper, and when the AKD is added more than 1.5 wt %, the amount of water absorbed in the sanitary paper will decrease excessively and the water dissolving property of the sanitary paper is deteriorated, which may cause a problem in that the sanitary paper cannot flushed in a toilet.

Here, more preferably, 1.3 wt % of an AKD, which is a neutral sizing agent for internal addition, may be added to the raw material for sanitary paper.

On the other hand, the strength enhancers are divided into surface sizing agents and internal addition strength enhancers according to the method of use. The internal addition strength enhancer used in the present disclosure is internally added to the pulp slurry for the purpose of enhancing strength (promoting hydrogen bonding between pulp fibers) or improving fixability of fillers and microfibers. Wet strength enhancers are sometimes added to special purpose paper to give it strength when wet. Examples of wet strength enhancers include melamine resin, polyethyleneimine, and polyamide polyamine resin.

In order to maintain a predetermined level of strength even when wet with water, PAE is added to paper such as cosmetic tissues or paper towels with wet strength enhancers. Generally, 12.5 wt % of PAE has been added 3% or more by weight to the wet part. For this reason, when a cosmetic tissue or paper towel disposed directly in the toilet, the cosmetic tissue or paper towel may not be flushed and may cause clogging.

Here, when the sanitary paper is disposed in the toilet, the paper should be dissolved well in water in order not to clog the toilet.

In the present disclosure, water dispersibility of the paper was adjusted, wherein wet strength enhancer was added to the paper in an amount less than the wet strength enhancer added level of a cosmetic tissue or paper towel to wrap the dog feces with sanitary paper so that it was flushed without clogging when disposed in a toilet.

To this end, in the present disclosure, the level of PAE added was adjusted to 1 to 1.5 wt % in the raw material for sanitary paper to provide wet strength and adequate water dispersibility, in which wet strength of about 10% of the dry strength can be manifested so that it does not break even when the dog feces is wrapped with sanitary paper, unlike in the case of cosmetic tissues or paper towels, and can be flushed without clogging a toilet.

When the addition level of PAE which is the wet strength enhancer, is lower than 1 wt %, the wet tensile strength of the sanitary paper is too weak, and there is a problem of easily leaking out when wrapping dog feces. On the other hand, when the addition level of PAE, which is the wet strength enhancer, is higher than 1.5 wt %, the wet tensile strength is too strong, and there is a problem in that it cannot be flushed in a toilet due to poor water dissolving properties.

Here, more preferably, 1.3 wt % of PAE may be added in the raw material for sanitary paper.

In the manufacturing method of the sanitary paper for handling dog feces of the present disclosure, an AKD, which is a neutral sizing agent for internal use, may be added to provide water resistance in the raw material of the sanitary paper, and sequentially PAE, which is a wet strength enhancer, may be added thereto to provide a wet strength and water dispersibility. In addition, the addition of AKD and PAE may be added in the reverse order or may be added simultaneously when necessary, such as on-site conditions.

On the other hand, in the paper manufacturing process, the paper undergoes a creping process in which a special knife (creping blade) forms wrinkles on the paper from the drying drum and thickens the paper in this process. The paper structure is changed and many transverse folds are formed thereby causing the final product to be soft and stretchable.

In the present disclosure, as rough wrinkles are formed instead of fine wrinkles in the existing sanitary paper, when the dog feces is wrapped with the sanitary paper, the sanitary paper has excellent elasticity and is easily closed, but the surface in contact with the dog feces is small so that the feces does not leak out.

FIG. 1 shows a perspective view of a sanitary paper 100 for handling dog feces according to an example of the present disclosure.

The sanitary paper 100 according to the present disclosure is provided that in order to ensure elasticity and prevent feces from getting a user's hands, creping may be performed at 10 to 15 crepe/cm in the manufacturing process of the above sanitary paper 100.

In the drying process of sanitary paper using a Yankee dryer, etc., wrinkles can be formed in the width direction of the paper by creping, generally, fine wrinkles of 20 to 40 crepe/cm are formed. However, in the present disclosure, unlike cosmetic tissues or paper towels, the sanitary paper forms a rough crepe of 10 to 15 crepe/cm to have an excellent elasticity and to prevent dog feces from leaking out while being easily closed, thereby reducing the area in direct contact with the dog feces when wrapping the dog feces with the sanitary paper 100.

When the sanitary paper 100 is roughly wrinkled so that the number of crepes is less than 10 crepe/cm, a problem of lowering the strength of the paper appears. There is a problem in that the dry tensile strength is lowered, and thus the wet tensile strength is also weakened. On the contrary, when the sanitary paper is finely wrinkled so that the number of crepes is greater than 15 crepe/cm, the area of contact with water is increased as the amount of water absorption is increased. That causes a problem that the area in contact with the feces is increased and the feces leaks out.

Here, more preferably, creping may be performed at 10 to 15 crepes per 1 cm in the manufacturing process of the above sanitary paper 100.

The sanitary paper 100 for handling dog feces according to an example of the present disclosure may be provided with water resistance, wet strength, elasticity, and water dispersibility together in the manufacturing process to collect dog feces and dispose thereof in a toilet.

Paper is originally made by processing wood, but it can also be made by reusing recovered paper, which is used paper, and when paper is made by reusing recovered paper, manufacturing costs can be reduced and quality can be good.

Therefore, the sanitary paper 100 according to the present disclosure can be prepared by including biodegradable cellulose such as recycled pulp as a paper raw material. In addition, milk cartons may be used as a raw material for the regenerated pulp.

Hereinafter, the present disclosure will be described in more detail through examples. These examples are only for illustrating the present disclosure, and it will be apparent to those of ordinary skill in the art that the scope of the present disclosure is not to be construed as being limited by these examples.

Example

The sanitary paper 100, which has water resistance, wet strength, elasticity, and water dispersibility together to collect dog feces and dispose thereof in a toilet, was manufactured with a basis weight of 33 g/m² using the Crescent Paper Machine of S company in Sejong City. The sanitary paper 100 may be manufactured from a milk carton that is biodegradable cellulose made of recycled pulp as a raw material. After adding 1.3 wt % of AKD, which is an internal additive neutral sizing agent with a solid content of 20%, to the machine chest where the regenerated milk carton pulp was introduced, 1.3 wt % of PAE polyamide which is a wet strength enhancer with a solid content of 12.5% was sequentially added. The wrinkles of the paper to which AKD and PAE were sequentially added were creped at 13 Crepe/cm through a creping in a Yankee dryer to prepare a wrinkled sanitary paper 100.

The Cobb size diagram, dry and wet tensile strength, and water dispersibility of the sanitary paper 100 prepared by the above process were measured.

To measure the Cobb size, place the paper on the Cobb sizing tester, place a measuring ring, and fix the paper with the measuring ring. The size of the paper should be the size that will fit inside the measuring ring. Generally, the paper is cut to 15 cm×15 cm. Pour 100 ml of water, pour out the water 2 minutes later, remove the water using filter paper, etc., and then measure the weight difference between the water absorbed paper and the paper without absorption. When the difference value is multiplied by 100, the Cobb size is also a numerical value.

For water dispersibility, that is, a dispersibility test in water, a rectangular test piece with a side length of 98 mm is folded horizontally and vertically in 300 mL of water at 20° C. in a 300 mL beaker, and dissociated at a stirring speed of 600 rpm using a magnetic stirrer. The test was carried out in such a way that the time required until the paper was completely dissolved was measured. The measurement results of the above items, such as loosening properties in water, were tested 5 times and the average value was obtained and shown.

Comparative Example 1

Sanitary paper, which has water resistance, wet strength, elasticity, and water dispersibility together to collect dog feces and dispose thereof in a toilet, was manufactured with a basis weight of 33 g/m² using the Crescent Paper Machine of S company in Sejong City. The sanitary paper may be manufactured from a milk carton that is biodegradable cellulose made of recycled pulp as a raw material. After adding 0.5 wt % of AKD, which is an internal additive neutral sizing agent with a solid content of 20%, to the machine chest where the regenerated milk carton pulp was introduced, 1.3 wt % of PAE polyamide which is a wet strength enhancer with a solid content of 12.5% was sequentially added. The wrinkles of the paper to which AKD and PAE were sequentially added were creped at 13 crepe/cm through a creping in a Yankee dryer to prepare a wrinkled sanitary paper.

Cobb size diagram, dry and wet tensile strength, and water dispersibility of the sanitary paper prepared by the above process were measured.

Comparative Example 2

The sanitary paper, which has water resistance, wet strength, elasticity, and water dispersibility together to collect dog feces and dispose thereof in a toilet, was manufactured with a basis weight of 33 g/m² using the Crescent Paper Machine of S company in Sejong City. The sanitary paper may be manufactured from a milk carton that is biodegradable cellulose made of recycled pulp as a raw material. After adding 2.0 wt % of AKD, which is an internal additive neutral sizing agent with a solid content of 20%, to the machine chest where the regenerated milk carton pulp was introduced, 1.3 wt % of PAE polyamide which is a wet strength enhancer with a solid content of 12.5% was sequentially added. The wrinkles of the paper to which AKD and PAE were sequentially added were creped at 13 crepe/cm through a creping in a Yankee dryer to prepare a wrinkled sanitary paper.

Cobb size diagram, dry and wet tensile strength, and water dispersibility of the sanitary paper prepared by the above process were measured.

Comparative Example 3

The sanitary paper, which has water resistance, wet strength, elasticity, and water dispersibility together to collect dog feces and dispose thereof in a toilet, was manufactured with a basis weight of 33 g/m² using the Crescent Paper Machine of S company in Sejong City. The sanitary paper may be manufactured by a milk carton that is biodegradable cellulose made of recycled pulp as a raw material. After adding 1.3 wt % of AKD, which is an internal additive neutral sizing agent with a solid content of 20%, to the machine chest where the regenerated milk carton pulp was introduced, 0.5 wt % of PAE polyamide which is a wet strength enhancer with a solid content of 12.5% was sequentially added. The wrinkles of the paper to which AKD and PAE were sequentially added were creped at 13 crepe/cm through a creping in a Yankee dryer to prepare a wrinkled sanitary paper.

Cobb size diagram, dry and wet tensile strength, and water dispersibility of the sanitary paper prepared by the above process were measured.

Comparative Example 4

The sanitary paper, which has water resistance, wet strength, elasticity, and water dispersibility together to collect dog feces and dispose thereof in a toilet, was manufactured with a basis weight of 33 g/m² using the Crescent Paper Machine of S company in Sejong City. The sanitary paper may be manufactured from a milk carton that is biodegradable cellulose made of recycled pulp as a raw material. After adding 1.3 wt % of AKD, which is an internal additive neutral sizing agent with a solid content of 20%, to the machine chest where the regenerated milk carton pulp was introduced, 2.0 wt % of PAE polyamide which is a wet strength enhancer with a solid content of 12.5% was sequentially added. The wrinkles of the paper to which AKD and PAE were sequentially added were creped at 13 crepe/cm through a creping in a Yankee dryer to prepare a wrinkled sanitary paper.

Cobb size diagram, dry and wet tensile strength, and water dispersibility of the sanitary paper prepared by the above process were measured.

Comparative Example 5

The sanitary paper, which has water resistance, wet strength, elasticity, and water dispersibility together to collect dog feces and dispose thereof in a toilet, was manufactured with a basis weight of 33 g/m² using the Crescent Paper Machine of S company in Sejong City. The sanitary paper may be manufactured from a milk carton that is biodegradable cellulose made of recycled pulp as a raw material. After adding 1.3 wt % of AKD, which is an internal additive neutral sizing agent with a solid content of 20%, to the machine chest where the regenerated milk carton pulp was introduced, 1.3 wt % of PAE polyamide which is a wet strength enhancer with a solid content of 12.5% was sequentially added. The wrinkles of the paper to which AKD and PAE were sequentially added were creped at 13 crepe/cm through a creping in a Yankee dryer to prepare a wrinkled sanitary paper.

Cobb size diagram, dry and wet tensile strength, and water dispersibility of the sanitary paper prepared by the above process were measured.

Comparative Example 6

The sanitary paper, which has water resistance, wet strength, elasticity, and water dispersibility together to collect dog feces and dispose thereof in a toilet, was manufactured with a basis weight of 33 g/m² using the Crescent Paper Machine of S company in Sejong City. The sanitary paper may be manufactured from a milk carton that is biodegradable cellulose made of recycled pulp as a raw material. After adding 1.3 wt % of AKD, which is an internal sizing neutral sizing agent with a solid content of 20%, to the machine chest where the regenerated milk carton pulp was introduced, 1.3 wt % of PAE polyamide which is a wet strength enhancer with a solid content of 12.5% was sequentially added. The wrinkles of the paper to which AKD and PAE were sequentially added were creped at a rate of 13 crepe/cm through a creping in a Yankee dryer to prepare a wrinkled sanitary paper.

Cobb size diagram, dry and wet tensile strength, and water dispersibility of the sanitary paper prepared by the above process were measured.

Table 1 shows the Cobb size, drying and wet tensile strength, and water loosening properties of the sanitary paper for dog feces handling in the above Embodiment and Comparative Examples 1 to 6.

TABLE 1

| | Cobb size (60 sec, g/m²) | dry tensile strength index (MD, Nm/g) | wet tensile strength index (MD, Nm/g) | water loosening (sec) |
|---|---|---|---|---|
| Example | 17.2 | 17.3 | 3.5 | 30 |
| Comparative Example 1 | 35.3 | 17.4 | 3.3 | 27 |
| Comparative Example 2 | 7.6 | 17.2 | 3.2 | 101 |
| Comparative Example 3 | 17.4 | 17.5 | 1.8 | 25 |
| Comparative Example 4 | 17.1 | 17.5 | 4.5 | 120 |
| Comparative Example 5 | 17.3 | 10.1 | 1.9 | 29 |
| Comparative Example 6 | 33.7 | 18.5 | 3.7 | 31 |

From the above results, the effects of this invention can be summarized as follows: When AKD is added less than 1% by weight to the raw material of the sanitary paper, the Cobb absorption may increase excessively and the dog feces may leak out when the dog feces is wrapped.

Examples of Embodiment and Comparative Example 2 show that AKD is excessively added to exceed 1.5% by weight of raw materials for sanitary paper, which may result in excessive Cobb absorption, resulting in reduced water dissipation of sanitary paper, which may prevent flushing in a toilet.

In Comparative Example 3, when the addition level of PAE in the raw material of the sanitary paper is lower than 1% by weight, the wet tensile strength of the sanitary paper is too weak, and thus a problem of easily bursting when wrapping feces may occur. On the other hand, looking at the measurement results of Comparative Example 4, in which the PAE is added to the raw material for sanitary paper at a addition level of PAE higher than 1.5% by weight, the wet tensile strength is too strong, so that water cannot be discharged from the toilet due to poor dissolving properties of the sanitary paper.

Comparative Example 5 is a case showing the problem of reducing the strength of the paper as a problem due to the rough wrinkles of the sanitary paper that the number of crepes is less than 10 crepes. A rougher creping process means that the strata are bent more severely, and since a decrease in dry tensile strength cannot be avoided, the wet tensile strength may also be weakened. Comparative Example 5 is a case showing the problem of reducing the strength of the paper as a problem due to the rough wrinkles of the sanitary paper that the number of crepes is less than 10 crepes. A rougher creping process means that the strata are bent more severely, and since a decrease in dry tensile strength cannot be avoided, the wet tensile strength may also be weakened.

Therefore, as shown in Table 1, the sanitary paper 10 of the present disclosure can be provided with water resistance, wet strength, elasticity, and water dispersibility together by optimally including 1.3% by weight of each of AKD and PAE in order, in which the raw material for sanitary paper contains biodegradable cellulose made of recycled pulp, so that the sanitary paper which wraps the dog feces can be disposed in a toilet. According to the comparative review results of Embodiment 1 to Comparative Examples 6, even when 1 to 1.5% by weight of AKD and PAE are included in the raw materials of the sanitary paper, water resistance, wet strength, flexibility and water dispersibility can be provided in a toilet, so that the sanitary paper collected from the dog feces can be disposed in a toilet.

In the above, even though all the components constituting the embodiment of the present disclosure are described as being combined or operated in combination, the present disclosure is not necessarily limited to this embodiment. That is, within the scope of the object of the present disclosure, all of the components may be configured or operated by selectively combining one or more. In addition, terms such as "comprises", "comprises", or "have" described above mean that the corresponding component may be inherent, unless otherwise stated, excluding other components. Rather, it should be construed as being able to further include other components. All terms, including technical and scientific terms, have the same meaning as commonly understood by one of ordinary skill in the art to which the present disclosure belongs, unless otherwise defined. Commonly used terms such as terms defined in the dictionary should be interpreted as being consistent with the contextual meaning of the related art, and are not interpreted in an ideal or excessively formal meaning unless explicitly defined in the present disclosure.

The above description is merely illustrative of the technical spirit of the present disclosure, and various modifications and variations will be possible without departing from the essential characteristics of the present disclosure by those skilled in the art to which the present disclosure pertains. Therefore, the embodiments disclosed in the present disclosure are not intended to limit the technical spirit of the present disclosure, but to explain, and the scope of the technical spirit of the present disclosure is not limited by these embodiments. The protection scope of the present disclosure should be construed by the following claims, and all technical ideas within the scope equivalent thereto should be construed as being included in the scope of the present disclosure.

What is claimed is:

1. A method of manufacturing a sanitary paper for handling dog feces to properly dispose the dog feces, the method comprising:
    performing hydrophilization to impart a sanitary paper with water resistance by adding 1 to 1.5 wt % of an alkyl ketene dimer (AKD: Alkyl Ketene Dimer), which is a neutral sizing agent as an internal sizing, to a sanitary paper raw material;
    adding 1 to 1.5 wt % of polyamide polyamine epichlorohydrin (PAE) serving as a wet strength enhancer to the sanitary paper raw material so that the produced sanitary paper has wet strength and water dispersibility; and
    creping the produced sanitary paper at a rate of 10 to 15 crepe/cm in a process of drying the sanitary paper to impart elasticity to the produced sanitary paper and to prevent dog feces from leaking through the sanitary paper with which dog feces is wrapped.

2. The method according to claim 1, wherein the AKD, which is a neutral sizing agent as an internal sizing, is added in an amount of 1.3 wt % of an AKD so that the produced sanitary paper has water resistance.

3. A sanitary paper for handling of dog feces, the sanitary paper manufactured by the method of claim 2, the sanitary paper having water resistance, wet strength, elasticity, and water dispersibility.

4. The sanitary paper according to claim 3, wherein the sanitary paper is made from a sanitary paper raw material comprising biodegradable cellulose obtained from recycled pulp.

5. The method according to claim 1, wherein the polyamide polyamine-epichlorohydrin (PAE), which is a wet strength enhancer, is added in an amount of 1.3 wt % so that the produced sanitary paper has wet strength and water dispersibility.

6. A sanitary paper for handling of dog feces, the sanitary paper manufactured by the method of claim 5, the sanitary paper having water resistance, wet strength, elasticity, and water dispersibility.

7. The sanitary paper according to claim 6, wherein the sanitary paper is made from a sanitary paper raw material comprising biodegradable cellulose obtained from recycled pulp.

8. The method according to claim 1, wherein the sanitary paper is creped at a rate of 13 crepe/cm during the drying process to impart elasticity to the sanitary paper and to prevent feces from leaking through the sanitary paper.

9. A sanitary paper for handling of dog feces, the sanitary paper manufactured by the method of claim 8, the sanitary paper having water resistance, wet strength, elasticity, and water dispersibility.

10. The sanitary paper according to claim 9, wherein the sanitary paper is made from a sanitary paper raw material comprising biodegradable cellulose obtained from recycled pulp.

11. The method according to claim 1, wherein the sanitary paper raw material contains biodegradable cellulose obtained from recycled pulp.

12. A sanitary paper for handling of dog feces, the sanitary paper manufactured by the method of claim 11, the sanitary paper having water resistance, wet strength, elasticity, and water dispersibility.

13. The sanitary paper according to claim 12, wherein the sanitary paper is made from a sanitary paper raw material comprising biodegradable cellulose obtained from recycled pulp.

14. A sanitary paper for handling of dog feces, the sanitary paper manufactured by the method of claim 1, the sanitary paper having water resistance, wet strength, elasticity, and water dispersibility.

15. The sanitary paper according to claim 14, wherein the sanitary paper is made from a sanitary paper raw material comprising biodegradable cellulose obtained from recycled pulp.

\* \* \* \* \*